(12) United States Patent
Tiirola et al.

(10) Patent No.: US 10,182,462 B2
(45) Date of Patent: Jan. 15, 2019

(54) CONFIGURING PHYSICAL CHANNEL RESOURCES FOR SOUNDING OR DISCOVERY IN A HALF DUPLEX COMMUNICATION ENVIRONMENT

(71) Applicant: NOKIA SOLUTIONS AND NETWORKS OY, Espoo (FI)

(72) Inventors: Esa Tapani Tiirola, Kempele (FI); Kari Pekka Pajukoski, Oulu (FI)

(73) Assignee: Nokia Solutions and Networks Oy, Espoo (FI)

(*) Notice: Subject to any disclaimer, the term of this patent is extended or adjusted under 35 U.S.C. 154(b) by 63 days.

(21) Appl. No.: 15/119,871

(22) PCT Filed: Feb. 20, 2014

(86) PCT No.: PCT/EP2014/053318
§ 371 (c)(1),
(2) Date: Aug. 18, 2016

(87) PCT Pub. No.: WO2015/124186
PCT Pub. Date: Aug. 27, 2015

(65) Prior Publication Data
US 2017/0111944 A1    Apr. 20, 2017

(51) Int. Cl.
| | |
|---|---|
| *H04L 5/16* | (2006.01) |
| *H04W 76/14* | (2018.01) |
| *H04L 5/00* | (2006.01) |
| *H04W 8/00* | (2009.01) |
| *H04W 72/04* | (2009.01) |

(Continued)

(52) U.S. Cl.
CPC ........... *H04W 76/14* (2018.02); *H04L 5/0048* (2013.01); *H04L 5/16* (2013.01); *H04W 8/005* (2013.01); *H04W 72/0486* (2013.01); *H04W 72/087* (2013.01); *H04W 72/121* (2013.01); *H04W 72/1236* (2013.01); *H04W 72/1252* (2013.01)

(58) Field of Classification Search
CPC ....... H04W 76/023; H04L 5/0048; H04L 5/16
See application file for complete search history.

(56) References Cited

U.S. PATENT DOCUMENTS

2013/0083779 A1* 4/2013 Ahn .................. H04W 72/04
370/336
2013/0258996 A1   10/2013 Jung et al.
(Continued)

FOREIGN PATENT DOCUMENTS

| WO | 2014/111154 A1 | 7/2014 |
| WO | 2014/154256 A1 | 10/2014 |
| WO | 2015/043633 A1 | 4/2015 |

OTHER PUBLICATIONS

International Search Report & Written Opinion for PCT/EP2014/053318, dated Oct. 23, 2014, 11 pages.

(Continued)

*Primary Examiner* — Zhiren Qin
(74) *Attorney, Agent, or Firm* — Brake Hughes Bellermann LLP (57) ABSTRACT

A configuration mechanism for physical channel resources for sounding or discovery in a half-duplex communication environment for apparatuses belonging to a service group is disclosed, the configuration mechanism taking into account a required capacity for sounding or discovery and a maximum tolerated latency for the service group.

13 Claims, 9 Drawing Sheets

(51) Int. Cl.
*H04W 72/08* (2009.01)
*H04W 72/12* (2009.01)

(56) References Cited

U.S. PATENT DOCUMENTS

| | | | | |
|---|---|---|---|---|
| 2013/0303199 A1* | 11/2013 | Siomina | H04W 64/00 | 455/456.5 |
| 2013/0322413 A1 | 12/2013 | Pelletier et al. | | |
| 2014/0003262 A1* | 1/2014 | He | H04W 28/08 | 370/252 |
| 2014/0126510 A1* | 5/2014 | Ogawa | H04L 5/0053 | 370/329 |
| 2014/0269558 A1* | 9/2014 | Sartori | H04W 48/16 | 370/329 |
| 2015/0043483 A1* | 2/2015 | Sartori | H04W 72/02 | 370/329 |
| 2015/0098416 A1* | 4/2015 | Kuo | H04W 72/10 | 370/329 |
| 2015/0133102 A1* | 5/2015 | Sorrentino | H04W 8/005 | 455/418 |
| 2015/0245192 A1* | 8/2015 | Wu | H04W 8/005 | 370/329 |
| 2015/0264551 A1* | 9/2015 | Ko | H04W 76/14 | 370/329 |
| 2016/0057604 A1* | 2/2016 | Luo | H04W 8/005 | 370/330 |
| 2016/0255615 A1* | 9/2016 | Chatterjee | H04W 76/18 | 370/330 |

OTHER PUBLICATIONS

R1-135617; ASUSTEK; "Method of resource allocation for D2D discovery"; 3GPP Draft; Nov. 2, 2013; 9 pages.

Lott, et al., "D2D—Time has come for Proximity-based Applications", Lott et al.; "D2D—Time has come for Proximity-based Applications"; Sep. 20, 2013; 23 pages.

* cited by examiner

| k \ M | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 2 | 3 | 4 | 5 | 6 | 7 | 8 | 9 | 10 | 11 | 12 | 13 | 14 | 15 | 16 | 17 | 18 | 19 | 20 |
| 2 |   | 1 | 3 | 6 | 10 | 15 | 21 | 28 | 36 | 45 | 55 | 66 | 78 | 91 | 105 | 120 | 136 | 153 | 171 | 190 |
| 3 |   |   | 1 | 4 | 10 | 20 | 35 | 56 | 84 | 120 | 165 | 220 | 286 | 364 | 455 | 560 | 680 | 816 | 969 | 1140 |
| 4 |   |   |   | 1 | 5 | 15 | 35 | 70 | 126 | 210 | 330 | 495 | 715 | 1001 | 1365 | 1820 | 2380 | 3060 | 3876 | 4845 |
| 5 |   |   |   |   | 1 | 6 | 21 | 56 | 126 | 252 | 462 | 792 | 1287 | 2002 | 3003 | 4368 | 6188 | 8568 | 11628 | 15504 |
| 6 |   |   |   |   |   | 1 | 7 | 28 | 84 | 210 | 462 | 924 | 1716 | 3003 | 5005 | 8008 | 12376 | 18564 | 27132 | 38760 |
| 7 |   |   |   |   |   |   | 1 | 8 | 36 | 120 | 330 | 792 | 1716 | 3432 | 6435 | 11440 | 19448 | 31824 | 50388 | 77520 |
| 8 |   |   |   |   |   |   |   | 1 | 9 | 45 | 165 | 495 | 1287 | 3003 | 6435 | 12870 | 24310 | 43758 | 75582 | 125970 |
| 9 |   |   |   |   |   |   |   |   | 1 | 10 | 55 | 220 | 715 | 2002 | 5005 | 11440 | 24310 | 48620 | 92378 | 167960 |
| 10 |   |   |   |   |   |   |   |   |   | 1 | 11 | 66 | 286 | 1001 | 3003 | 8008 | 19448 | 43758 | 92378 | 184756 |
| 11 |   |   |   |   |   |   |   |   |   |   | 1 | 12 | 78 | 364 | 1365 | 4368 | 12376 | 31824 | 75582 | 167960 |
| 12 |   |   |   |   |   |   |   |   |   |   |   | 1 | 13 | 91 | 455 | 1820 | 6188 | 18564 | 50388 | 125970 |
| 13 |   |   |   |   |   |   |   |   |   |   |   |   | 1 | 14 | 105 | 560 | 2380 | 8568 | 27132 | 77520 |
| 14 |   |   |   |   |   |   |   |   |   |   |   |   |   | 1 | 15 | 120 | 680 | 3060 | 11628 | 38760 |
| 15 |   |   |   |   |   |   |   |   |   |   |   |   |   |   | 1 | 16 | 136 | 816 | 3876 | 15504 |

*FIG. 5*

| k\M | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 1 | 1 | 1 | 1 | 1 | 1 | 1 | 1 | 1 | 1 | 1 | 1 | 1 | 1 | 1 | 1 |
| 2 | | 1 | 2 | 3 | 4 | 5 | 6 | 7 | 8 | 9 | 10 | 11 | 12 | 13 | 14 | 15 | 16 | 17 | 18 | 19 |
| 3 | | | 1 | 3 | 6 | 10 | 15 | 21 | 28 | 36 | 45 | 55 | 66 | 78 | 91 | 105 | 120 | 136 | 153 | 171 |
| 4 | | | | 1 | 4 | 10 | 20 | 35 | 56 | 84 | 120 | 165 | 220 | 286 | 364 | 455 | 560 | 680 | 816 | 969 |
| 5 | | | | | 1 | 5 | 15 | 35 | 70 | 126 | 210 | 330 | 495 | 715 | 1001 | 1365 | 1820 | 2380 | 3060 | 3876 |
| 6 | | | | | | 1 | 6 | 21 | 56 | 126 | 252 | 462 | 792 | 1287 | 2002 | 3003 | 4368 | 6188 | 8568 | 11628 |
| 7 | | | | | | | 1 | 7 | 28 | 84 | 210 | 462 | 924 | 1716 | 3003 | 5005 | 8008 | 12376 | 18564 | 27132 |
| 8 | | | | | | | | 1 | 8 | 36 | 120 | 330 | 792 | 1716 | 3432 | 6435 | 11440 | 19448 | 31824 | 50388 |
| 9 | | | | | | | | | 1 | 9 | 45 | 165 | 495 | 1287 | 3003 | 6435 | 12870 | 24310 | 43758 | 75582 |
| 10 | | | | | | | | | | 1 | 10 | 55 | 220 | 715 | 2002 | 5005 | 11440 | 24310 | 48620 | 92378 |
| 11 | | | | | | | | | | | 1 | 11 | 66 | 286 | 1001 | 3003 | 8008 | 19448 | 43758 | 92378 |
| 12 | | | | | | | | | | | | 1 | 12 | 78 | 364 | 1365 | 4368 | 12376 | 31824 | 75582 |
| 13 | | | | | | | | | | | | | 1 | 13 | 91 | 455 | 1820 | 6188 | 18564 | 50388 |
| 14 | | | | | | | | | | | | | | 1 | 14 | 105 | 560 | 2380 | 8568 | 27132 |
| 15 | | | | | | | | | | | | | | | 1 | 15 | 120 | 680 | 3060 | 11628 |

FIG.6

| k \ M | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 2 | 3 | 4 | 5 | 6 | 7 | 8 | 9 | 10 | 11 | 12 | 13 | 14 | 15 | 16 | 17 | 18 | 19 | 20 |
| 2 |   | 2 | 6 | 12 | 20 | 30 | 42 | 56 | 72 | 90 | 110 | 132 | 156 | 182 | 210 | 240 | 272 | 306 | 342 | 380 |
| 3 |   |   | 3 | 12 | 30 | 60 | 105 | 168 | 252 | 360 | 495 | 660 | 858 | 1092 | 1365 | 1680 | 2040 | 2448 | 2907 | 3420 |
| 4 |   |   |   | 4 | 20 | 60 | 140 | 280 | 504 | 840 | 1320 | 1980 | 2860 | 4004 | 5460 | 7280 | 9520 | 12240 | 15504 | 19380 |
| 5 |   |   |   |   | 5 | 30 | 105 | 280 | 630 | 1260 | 2310 | 3960 | 6435 | 10010 | 15015 | 21840 | 30940 | 42840 | 58140 | 77520 |
| 6 |   |   |   |   |   | 6 | 42 | 168 | 504 | 1260 | 2772 | 5544 | 10296 | 18018 | 30030 | 48048 | 74256 | 111384 | 162792 | 232560 |
| 7 |   |   |   |   |   |   | 7 | 56 | 252 | 840 | 2310 | 5544 | 12012 | 24024 | 45045 | 80080 | 136136 | 222768 | 352716 | 542640 |
| 8 |   |   |   |   |   |   |   | 8 | 72 | 360 | 1320 | 3960 | 10296 | 24024 | 51480 | 102960 | 194480 | 350064 | 604656 | 1007760 |
| 9 |   |   |   |   |   |   |   |   | 9 | 90 | 495 | 1980 | 6435 | 18018 | 45045 | 102960 | 218790 | 437580 | 831402 | 1511640 |
| 10 |   |   |   |   |   |   |   |   |   | 10 | 110 | 660 | 2860 | 10010 | 30030 | 80080 | 194480 | 437580 | 923780 | 1847560 |
| 11 |   |   |   |   |   |   |   |   |   |   | 11 | 132 | 858 | 4004 | 15015 | 48048 | 136136 | 350064 | 831402 | 1847560 |
| 12 |   |   |   |   |   |   |   |   |   |   |   | 12 | 156 | 1092 | 5460 | 21840 | 74256 | 222768 | 604656 | 1511640 |
| 13 |   |   |   |   |   |   |   |   |   |   |   |   | 13 | 182 | 1365 | 7280 | 30940 | 111384 | 352716 | 1007760 |
| 14 |   |   |   |   |   |   |   |   |   |   |   |   |   | 14 | 210 | 1680 | 9520 | 42840 | 162792 | 542640 |
| 15 |   |   |   |   |   |   |   |   |   |   |   |   |   |   | 15 | 240 | 2040 | 12240 | 58140 | 232560 |

CONFIGURING PHYSICAL CHANNEL
RESOURCES FOR SOUNDING OR
DISCOVERY IN A HALF DUPLEX
COMMUNICATION ENVIRONMENT

This application is a national stage entry of PCT Application No. PCT/EP2014/053318, filed Feb. 20, 2016, entitled "CONFIGURING PHYSICAL CHANNEL RESOURCES FOR SOUNDING OR DISCOVERY IN A HALF DUPLEX COMMUNICATION ENVIRONMENT", which is hereby incorporated by reference in its entirety.

FIELD

The present invention relates to wireless communication, and particularly to half-duplex wireless device-to-device communication.

BACKGROUND

The following description of background art may include insights, discoveries, understandings or disclosures, or associations together with dis-closures not known to the relevant art prior to the present invention but provided by the invention. Some such contributions of the invention may be specifically pointed out below, whereas other such contributions of the invention will be apparent from their context.

In recent years, the phenomenal growth of mobile Internet services and proliferation of smart phones and tablets has increased a demand for mobile broadband services, and hence more network capacity is required. One possibility to increase network capacity and to provide new proximity based services to end users and/or different service providers is to deploy in addition to wide area systems local area systems providing device-to-device (D2D) communications. The device-to-device communication may be scheduled in a distributed manner or in a centralized (network assisted) manned. Regardless of the scheduling manner, channel state information (CSI) between devices is needed for scheduling, or at least to find out whether or not the devices are close enough for direct communication. Since the device-to-device communication may be implemented as a half-duplex communication, in which a device may either transmit or receive over a spectrum, receiving and sending phases of sounding signals, for example, needs be coordinated.

SUMMARY

A general aspect of the invention provides configuration mechanism for physical channel resources for sounding or discovery in a half-duplex communication environment for apparatuses belonging to a service group. Various aspects of the invention comprise a method, an apparatus, a computer program product and a system as defined in the independent claims. Further embodiments of the invention are disclosed in the dependent claims.

BRIEF DESCRIPTION OF THE DRAWINGS

In the following, the invention will be described in greater detail by means of preferred embodiments with reference to the attached drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any access network/system and apparatus that support scheduled device-to-device communication over half-duplex communication links. Examples of such access systems/networks include LTE (Long Term Evolution) access system, Worldwide Interoperability for Microwave Access (WiMAX), Wireless Local Area Network (WLAN), LTE Advanced (LTE-A), and beyond LTE-A, such as 5G (fifth generation). The specifications of different systems and networks, especially in wireless communication, develop rapidly. Such development may require extra changes to an embodiment. Therefore, all words and expressions should be interpreted broadly and they are intended to illustrate, not to restrict, the embodiment.

Device-to-device communication scheduling may be a centralized scheduling, also called a network assisted scheduling, or a distributed scheduling. In principle, in a centralized scheduling, one node is responsible for scheduling of a service group, whereas in a distributed scheduling nodes belonging to a service group are configured to perform the scheduling. Below different exemplary embodiments and examples are described using the centralized scheduling, without limiting the examples and the invention to such a scheduling manner.

Figure 1:
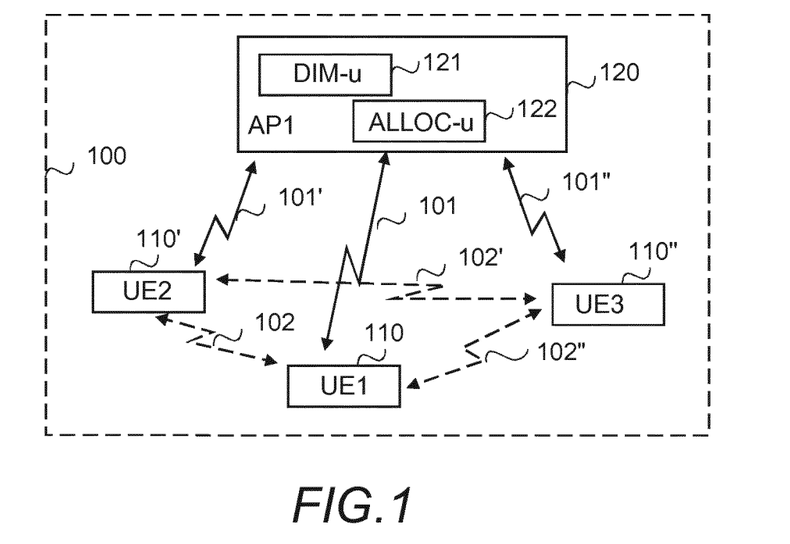
FIG. 1 shows simplified architecture of a system and block diagrams of some apparatuses according to an exemplary embodiment.

A general architecture of an exemplary local area system 100 is illustrated in FIG. 1. FIG. 1 is a simplified system architecture only showing some elements and functional entities, all being logical units whose implementation may differ from what is shown. It is apparent to a person skilled in the art that the system may also comprise other functions and structures that are not illustrated, for example connections to the core network/system.

The exemplary local area system 100 illustrated in FIG. 1 com-prises user equipments 110, 110', 110" and access points 120 (only one illustrated in FIG. 1) providing conventional connections 101, 101', 101" between the user equipments 110, 110', 110" and the access point 120 in both directions, and in addition to that direct communications 102, 102', 102" between the user equipments (also called nodes), and correspondingly communications (not illustrated in FIG. 1) between access points. In the illustrated example of FIG. 1, the user equipments can communicate directly with each other since they are assumed to be in close enough proximity. Should the distance between user equipments be too long, the communication between them would be relayed via the access point or via another user equipment.

In the exemplary local area system 100 the user equipments 110, 110', 110" are connected to a network (not illustrated in FIG. 1) via the access point, and the user equipments have been organized into at least one service group which share a physical channel (i.e. physical resources) for half-duplex direct communications 102, 102', 102". However, it should be appreciated that the service group may contain the access point. Further, only one or some of the user equipments may be connected to the access point(s) directly while rest of the user equipments are connected to the access point(s) via one or more user equipments. In an alternatively exemplary system, user equipments may form a service group using only device-to-device connections between the user equipments and have no connection to an external network.

Although in the exemplary local area system illustrated in FIG. 1 the user equipments 110, 110', 110" are connected to the same access point 120, it is equally possible that user equipments belonging to the same service group are operating under different access points.

The user equipment (UE) 110, 110', 110" refers to a wireless com-puting device (apparatus), and it may be a user terminal or a machine-type-communication (MTC) device, also called Machine-to-Machine device and peer-to-peer device. Such computing devices (apparatuses) include wireless communication devices operating with or without a subscriber identification module (SIM) in hardware or in software, including, but not limited to, the following types of devices: mobile phone, smart-phone, personal digital assistant (PDA), handset, laptop computer, e-reading device, tablet, game console, sensor, actuator, video camera, car, refrigerator, other domestic appliances, telemetry appliances, and telemonitoring appliances. The user equipment 110, 110', 110" is configured to receive and use information relating to device-to-device communication, just as information on a discovery/SRS (sound reference signal) pattern which to use, and the common physical resources configured for a service group the user equipment belongs to, for receiving and transmitting sounding reference signals, for example. The discovery is a process that identifies that an apparatus, such as UE, is in proximity of another apparatus, and sounding means transmitting and/or receiving sounding reference signals.

In the example of FIG. 1, the access point 120 depicts an apparatus providing access to the network the user equipments and the access point are connected to. Examples of such apparatuses include a WLAN access point, like a Wi-Fi hot spot, a wireless personal area network (WPAN) access point, a free-space optical communications access point using infrared, a WiMAX access point, an evolved node B and a base station. In the example, the access point 120 is configured to perform the centralized scheduling for the service group. For that purpose the access point 120 comprises a dimensioning unit 121 (DIM-u) for determining parameters M, k and N and sounding reference signal (SRS) pattern group (M,k) derivable from the parameters M and k, and an allocation unit 122 (ALLOC-u) for allocating SRS patterns from the determined SRS pattern group. Exemplary functionalities of the dimensioning unit 121 and the allocation unit 122 will be described in more detail below. However, in an implementation in which all SRS patterns in the determined SRS pattern group are always determined to be in use, the access point may comprise only the dimensioning unit. Further, in an implementation in which predetermined SRS pattern groups are used, the access point may comprise only the allocation unit configured to allocate SRS pattern sub-groups.

It should be appreciated that term "SRS pattern" used herein means "SRS discovery pattern", and pattern is interchangeable with discovery pattern.

The parameters M and N and the SRS pattern group k are used for providing common physical resources and transmission/reception (Tx/Rx) patterns for SRS transmission and channel state information (CSI) measurements for the service group when the physical resources are half-duplex device-to-device communication. The common physical resources for the service group are divided into M serial resources in time domain and into N parallel resources in frequency and/or code and/or in time domain, and the SRS pattern group defines either the number of Tx portions or the number of Rx portions within M Tx/Rx opportunities. The M serial resources are in different Orthogonal Frequency Division Multiple Access (OFDMA)/Single Carrier Frequency Division Multiple Access (SC-FDMA) symbols or sub-frames and necessary guard period (GP)/switching time reservation between consecutive resources is taken into account. The N parallel resources are for SRS transmissions (to convey one or more predetermined reference signal and/or other predetermined sequences) and allowing multiple user equipments (devices) in the Tx phase (Tx portion) to transmit SRS at the same time. The N parallel resources further support frequency selective CSI measurements, for example at a granularity of one physical resource block (PRB). It is also possible to consider, from SRS sounding point of view, J consecutive parallel time domain resources as a single serial resource. This is due to the fact that there are no restrictions in creating parallel resources: all existing multiple access schemes, such as Code Division Multiplexing (CDM), Time-Division Multiplexing (TDM), Frequency division multiplexing (FDM), etc., can be applied. When creating serial resources there is a restriction: a switching gap is needed between consecutive serial resources.

It should be appreciated that instead of the access points, one of the user equipments belonging to the service group may be configured to be a master node performing the configuring, and therefore to comprise at least one of the dimensioning unit and the allocation unit. Further, in a distributed scheduling some or all of the user equipments comprise at least one of the dimensioning unit and the allocation unit, i.e. are configured to perform the configuring of the physical resources for sounding. It should be appreciated that in a distributed scheduling an access point not configured to perform the configuration of the physical resources for sounding, i.e. an access point not comprising the dimensioning unit and the allocation unit, may be used.

It is also noted that different hybrid solutions are also possible. For example, an access point may be in charge of dimensioning and configuring the SRS resources in a certain cell whereas user equipments may allocate the SRS patterns in a distributed manner.

Figure 2:
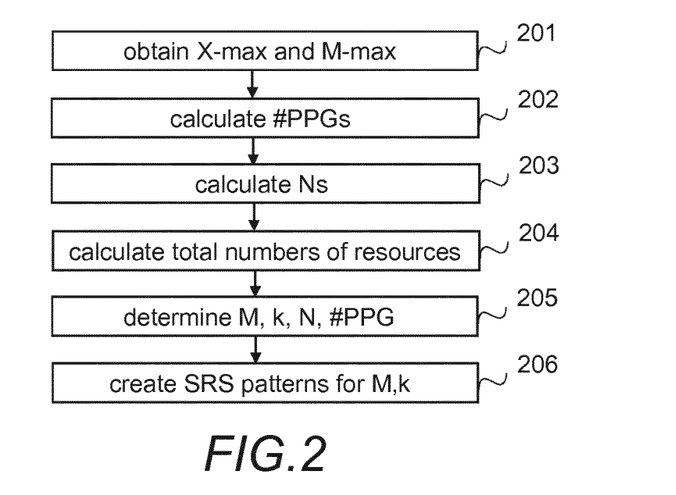
FIGS. 2, 3 and 4 are flow charts illustrating exemplary functionalities.

FIG. 2 is a flow chart illustrating an exemplary functionality of an apparatus comprising the dimensioning unit. In the illustrated example, the apparatus, or more precisely, the dimensioning unit is configured to determine N, M and k each time they are needed. Typically this is performed when a group is formed, or when reconfiguration is needed, due to running out of bi-directional SRS patterns, for example.

Therefore, the dimensioning unit obtains in step 201 input values for the dimensioning process. The obtained input values, i.e. design parameters, in the example are a required maximum capacity for sounding, X-max, and a maximum tolerated latency, M-max. Since all user equipment (nodes) can measure CSI from each link, and it should be possible that all connections are measured during M serial resources, the required maximum sounding capacity corresponds to the number of user equipments (nodes) that can be part of a bi-directional sounding. The maximum tolerated latency, M-max, is also the maximum amount of serial resources, i.e. Tx/Rx opportunities, in the time domain, since the amount of serial resources in the time domain affect to the latency. The sounding latency in terms of absolute time units, such as seconds or milliseconds, depends on the length and periodicity of available serial resources in addition to M-max. X-max may be a predefined system parameter that is a static value in the memory of the apparatus or stored to a remote memory or data store or hard-coded to the apparatus in which cases X-max is obtained by retrieving it; or the apparatus may obtain it by receiving X-max as a signalling value, in a broadcast or in O&M (Operation and Maintenance) signalling, for example, or X-max may be obtained by determining it based on the number of user equipments belonging to the service group. For example, if the physical resources are dimensioned to support 100 user equipments, X-max may be 100, or the X-max may be determined on based on the number of user equipments actually belonging to the service group. X-max may also be an access point-specific parameter, or the access point is taken into account when X-max is determined. For example, in local area conditions, X might be smaller whereas in wide area conditions X might be bigger. The same applies to M-max.

Figure 5:
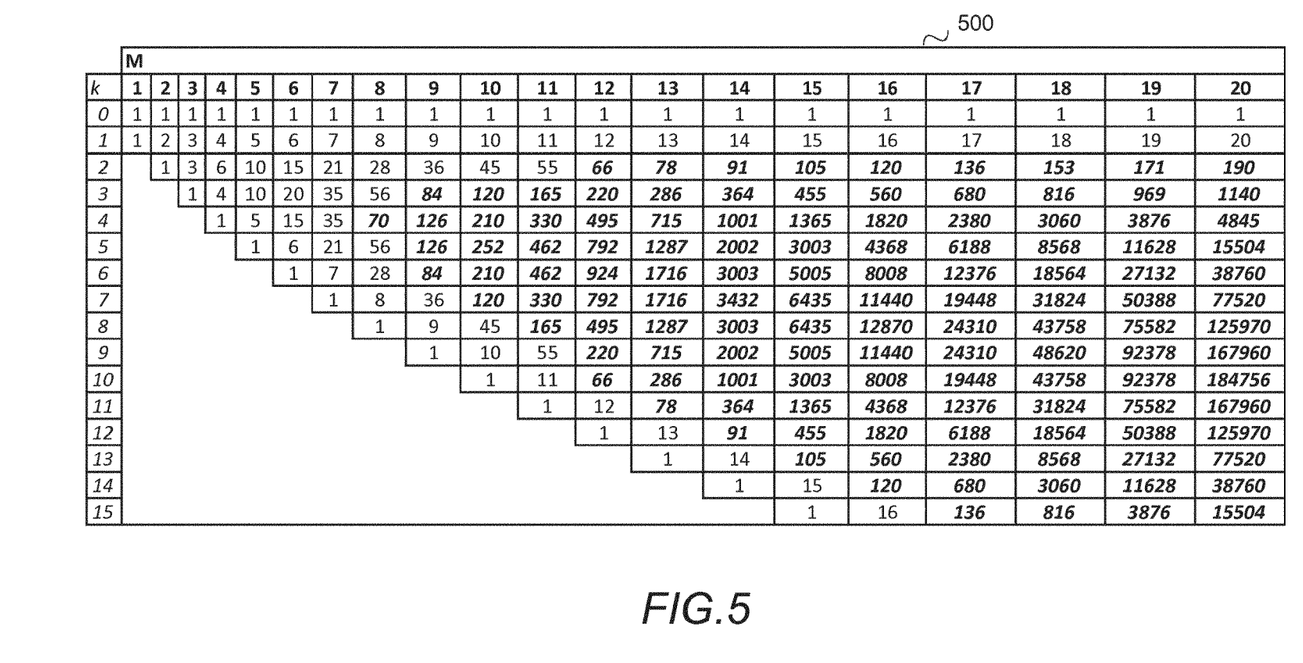
FIGS. 5, 6 and 7 illustrate intermediate results in an exemplary dimensioning.

First, a number of patterns per pattern group, denoted herein as #PPG, is calculated in step 202 for a set of pattern groups. The number of patterns per group may be calculated using following formula (1), which is used for bi-directional discovery patterns. It should be appreciated that other formulas used for bi-directional discovery patterns may be used as well.

$$\#PPG = M!/k!(M-k)! \tag{1}$$

wherein #PPG is the number of patterns per group,
M=(1, 2, . . . M-max)
k=(0, 1 . . . M-max) and defines the number of Tx-portions In an example 1 inputted parameters are X-max=60 and M-max=20, and part of the result (i.e. up to an including k=15) of step 202 is illustrated in the table 500 of FIG. 5. The values represent the number of patterns per group defined by corresponding k and M, and the values in bold italic are #PPGs that are bigger than X-max, i.e. there should be enough patterns for the service group.

Figure 6:
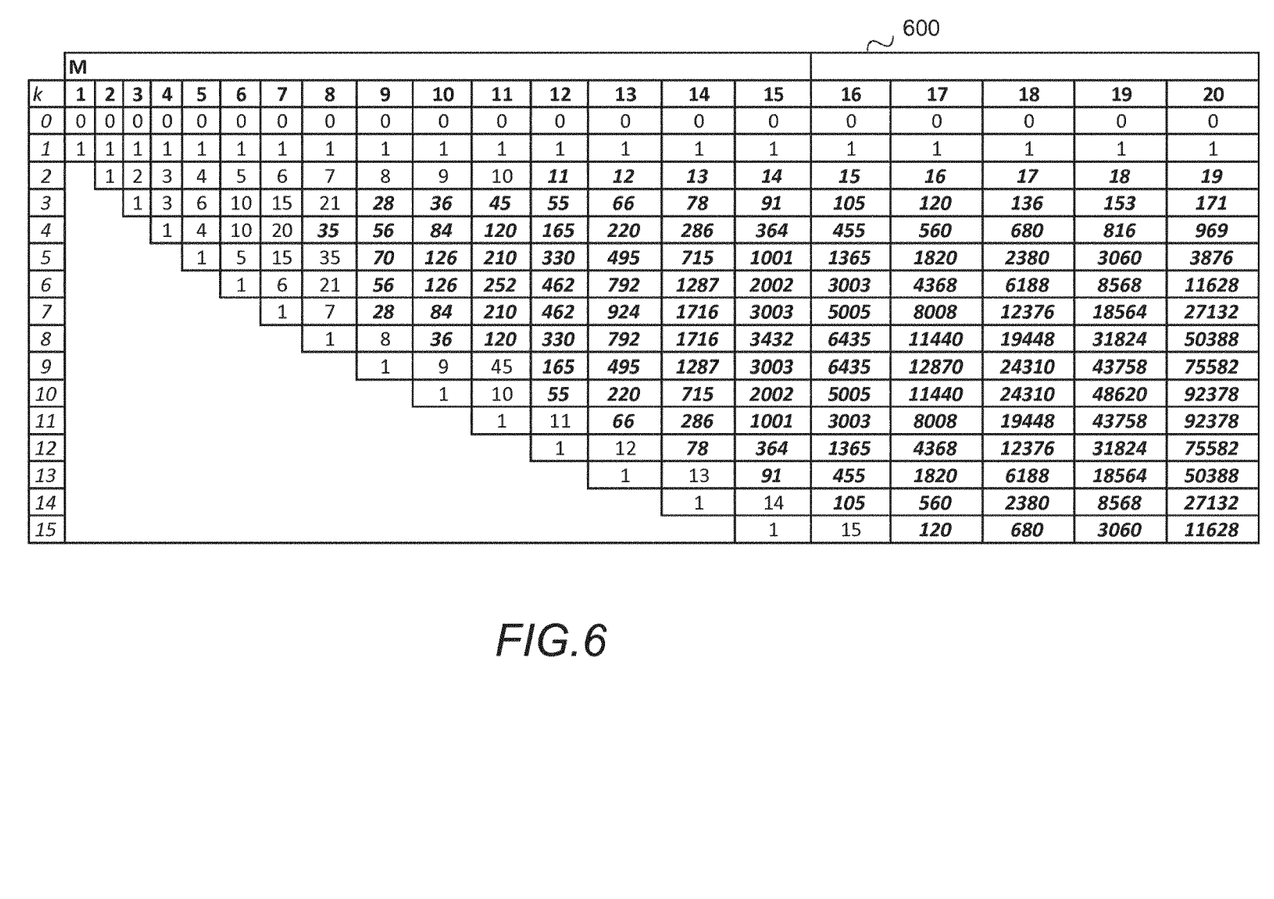

Then the number of parallel resources N for the set of pattern groups is calculated in step 203. N may be calculated using for example following formula (2):

$$N(k, M) = \frac{k \cdot (M-1)!}{k!(M-k)!} \tag{2}$$

wherein N is the number of parallel resources,
M=(1, 2, . . . M-max)
k=(0, 1 . . . M-max) and defines the number of Tx-portions The table 600 in FIG. 6 illustrates part of the result of this step for the example 1 (input values X-max=60 and M-max=20). The values define the number of parallel resources N needed to support patterns of the table in FIG. 5, defined by corresponding k and M. The values in bold italic are for the same k and M combinations than in the table 500 in FIG. 5, i.e. they indicate #PPGs that are bigger than X-max.

Where the number of parallel resources N needed to support the patterns have been calculated, total number of resources needed per cycle (sounding cycle) are calculate using following formula (3)

$$\#TOTAL = N*M \tag{3}$$

wherein #TOTAL=total number of resources needed in the physical channel per cycle;
N=number of parallel resources N needed to support the pattern, calculated using formula (2); and
M=(1, 2, . . . M-max)

Figure 7:
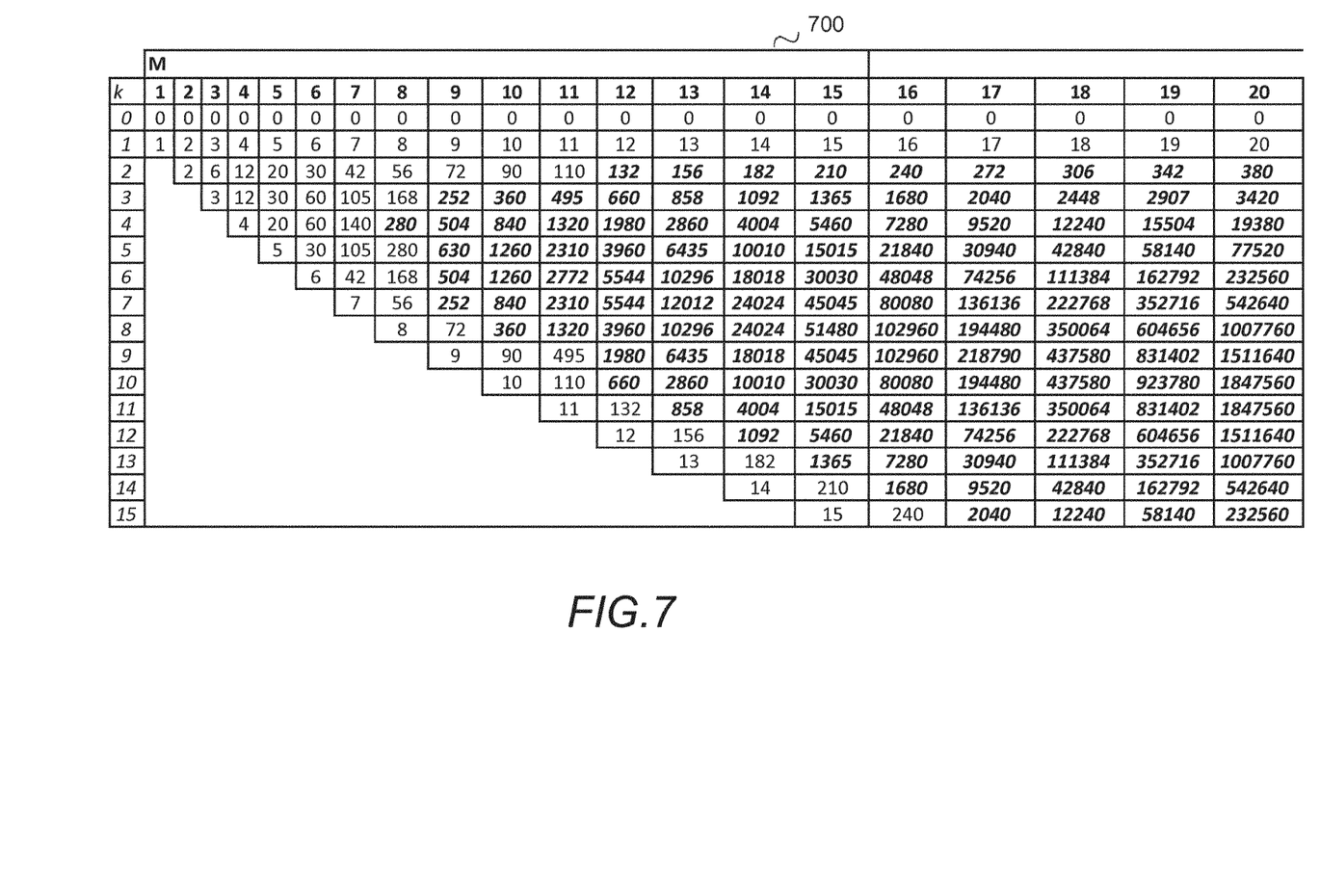

The table 700 in FIG. 7 illustrates part of the result of this step for the example 1 (input values X-max=60 and M-max=20). The values define the number of total resources taking into account both parallel and serial resources. The values in bold italic are for the same k and M combinations than in the table 500 in FIG. 5, i.e. they indicate #PPGs that are bigger than X-max.

Then values for N, M and k are determined in step 205 according to one or more predetermined rules. Any rule may be used, but in order to minimize overall resource consumption with the given latency but still ensure enough capacity, one should select the combination of M and k which has the smallest total number of resources needed in the physical channel per cycle amongst those whose number of patterns per group is bigger than or equal to X-max to ensure that there is enough patterns for the traffic over the physical channel. (If the number of patterns is so small that the physical channel runs out of the patterns, one cannot generate more patterns while maintaining the planned latency.) In other words, a selection made on the basis of the rule minimizes the overall resource consumption with boundary conditions: the required sounding capacity constraint (X-max) and maximum tolerated latency constraint M-max. The selected combination of M and k is then used to determine N, and #PPG, either from a corresponding table, or using formulas (2) and (1) with the selected k and M values. The dimensioning of common physical resources and selection of the SRS patterns group with constrained sounding latency is hence performed. In other words, outcome of the dimensioning is the SRS pattern group with minimized resource consumption with given latency and required maximum capacity.

In the example 1 (input values X-max=60, M-max=20), bold italic numbers in the table 500 in FIG. 5, the table 600 in FIG. 6 and the table 700 in FIG. 7 are combinations of M and k whose total number of resources needed per cycle is bigger than X-max, and from the table 700 in FIG. 7 it can be seen that the combination k=2, M=12 has the smallest total number of resources amongst those fulfilling the resource requirement. From the table 600 in FIG. 6, using the selected combination, one can determine that the number of parallel resources N needed for sounding is 11, and from the table 500 in FIG. 5 one can determine that the number of patterns per group is 66. M, by defining the number of serial resources, defines the length of the transmission pattern.

As can be seen from the tables in FIGS. 5 to 7, it is possible to use as an upper limit to k a smaller limit than M-max.

Although in the above the pattern groups are calculated using granularity of 1, it should be appreciated that a granularity of 2 or 3 or any other suitable granularity may be used, for example M=(1, 4, 7, . . . M-max) and/or k=(0, 1, 4, 7, . . . M-max). The result obtained with the coarser granularity may be used to select the pattern group, or as an initial selection of the pattern group. In case the result is used as an initial selection, calculations are repeated around the initial selection with a finer granularity and the result of the latter calculation is used for the final selection of the pattern group and the values.

In the illustrated example, the dimensioning unit is further configured to create in step 206 all bi-directional SRS patterns for the selected pattern group (M, k). The creation is a straightforward operation: M defines the length of the pattern, each pattern contains k resources needed for SRS transmission and M−k resources available for other measuring SRS transmissions from other user equipments belonging to the same service group, and each pattern is unique, the amount of unique patterns being #PPG. A table 800 that is a combination of tables 801, 802 and 803, disclosed in FIGS. 8A, 8B and 8C, correspondingly, presents all bi-directional SRS patterns for the example 1 (input parameters k=2, M=12), in an arbitrary order; the resources needed for SRS transmissions are the hatched areas denoted by 1, the resources available for CSI measurements corresponding to other uses/patterns part of the same service group are being denoted by 0. The running numbers just indicate a "parallel resource number", the total number of N (11) indicating the amount of parallel resources, when M (12) is the amount of serial resources and k (2) indicates the number of Tx portions.

If the system target is to configure all SRS patterns in the determined SRS pattern group to be in use for sounding (i.e. for SRS transmissions and CSI measurement), the above described functionality suffices to reach the target. In other words, it suffices that the dimensioning of common SRS resources for the service group and the selection of the SRS pattern group with constrained sounding latency for the service group is performed (i.e. steps 201-204 are performed, and then the serial and parallel resources for SRS sounding are configured based on the results of the dimensioning and the selection (i.e. steps 205 and 206 are performed and physical resources determined).

Typically not all available SRS patterns are used, so in order to further minimize the resource consumption, the apparatus performing the configuration of the physical channel is configured, by means of the allocation unit, to allocate the available patterns in a specific order so that only a sub-set of the available patterns are selected (allocated) to be in use. For example, the process described above with FIG. 2 is performed using the maximum number of user equipments that can be belong to the service group, but the actual number of user equipments belonging to the service group is smaller.

Figure 3:
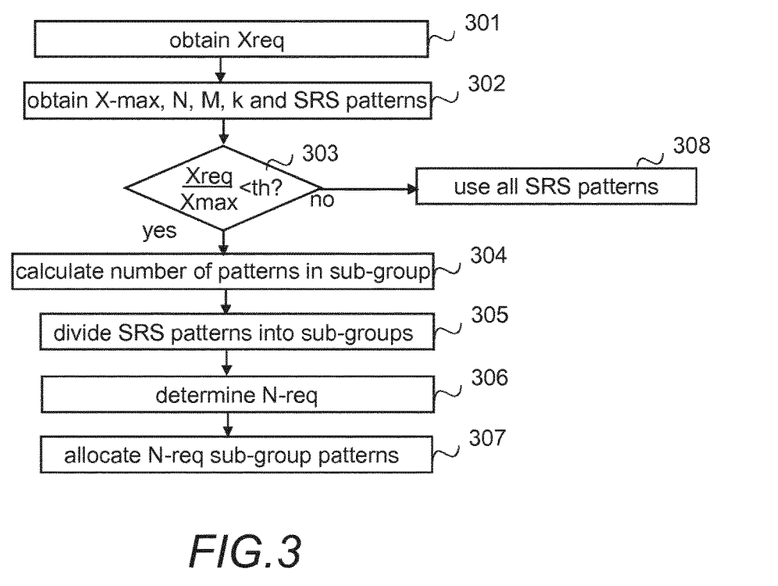

FIG. 3 is a flow chart illustrating an exemplary functionality of an apparatus comprising the allocation unit, in a normal use case scenario, in which the number of user equipments is less than what was used as input X-max. For example, if the physical resources are dimensioned to support 100 user equipments, X-max is 100, but if in practise the number of user equipments in the service group is 56, the required capacity for sounding, Xreq, is 56.

Referring to FIG. 3, when Xreq for a service group is obtained in step 301, the allocation unit obtains in step 302 X-max, N, M, k and SRS patterns determined for the service group. It may be that an apparatus comprising both the dimensioning unit and the allocation unit receives as input X-max and M-max, and then performs the functionality described above with FIG. 2, stores the result at least temporarily to a memory of the user apparatus, or to a memory accessible by the user apparatus, and after a first cycle of sounding determines the number of user equipments, and uses that as Xreq, and reconfigures the resources. Xreq may also be received as an external input. Further, Xreq may be updated during operation to correspond the actual situation as many times as necessary.

When all the information is obtained, it is checked in step 303 whether or not the relationship Xreq/X-max is below a threshold. The threshold may be 1, 0.9, 0.8, or any value below 1. If the relationship is below the threshold, a number of patterns in a sub-group is calculated in step 304. The number of patterns in a sub-group may be calculated by equation M/k. However, the number of patterns may vary slightly between different sub-groups according to the available patterns in the pattern group. Further, the number of patterns has to be an integer. For these reasons, the result of equation M/k is only approximate value of the number of patterns in a sub-group and the actual value may be smaller than, equal to, or greater than the result. In the example 1 described above (inputs X-max=60, M-max=20), selected pattern group defines M=12 and k=2, and hence the number of patterns in a sub-group is 6.

After that the SRS patterns are divided in step 305 into N orthogonal sub-groups using a following rule: a transmission portion (phase) appears at maximum once at a time within patterns that are part of the same sub-group, and each sub-group consumes one parallel resource (out of N). In other words, the allocating unit organizes SRS patterns from the SRS pattern group to a specific, coordinated order with minimized resource consumption.

The number of actual parallel physical resources required, Nreq, is determined. In other words, parallel resources are configured. Nreq may be determined by means of the following formula (4) providing an approximate value.

$$Nreq \cong \operatorname{ceiling}\left(\frac{Xreg * k}{M}\right) \quad (4)$$

wherein Xreq=required capacity for sounding;
k and M are values defining the pattern groups, obtained in step 302 (determined in step 205 of FIG. 2)

When Nreq is known, sub-group patterns are allocated for the service group in step 307.

Figure 8A:
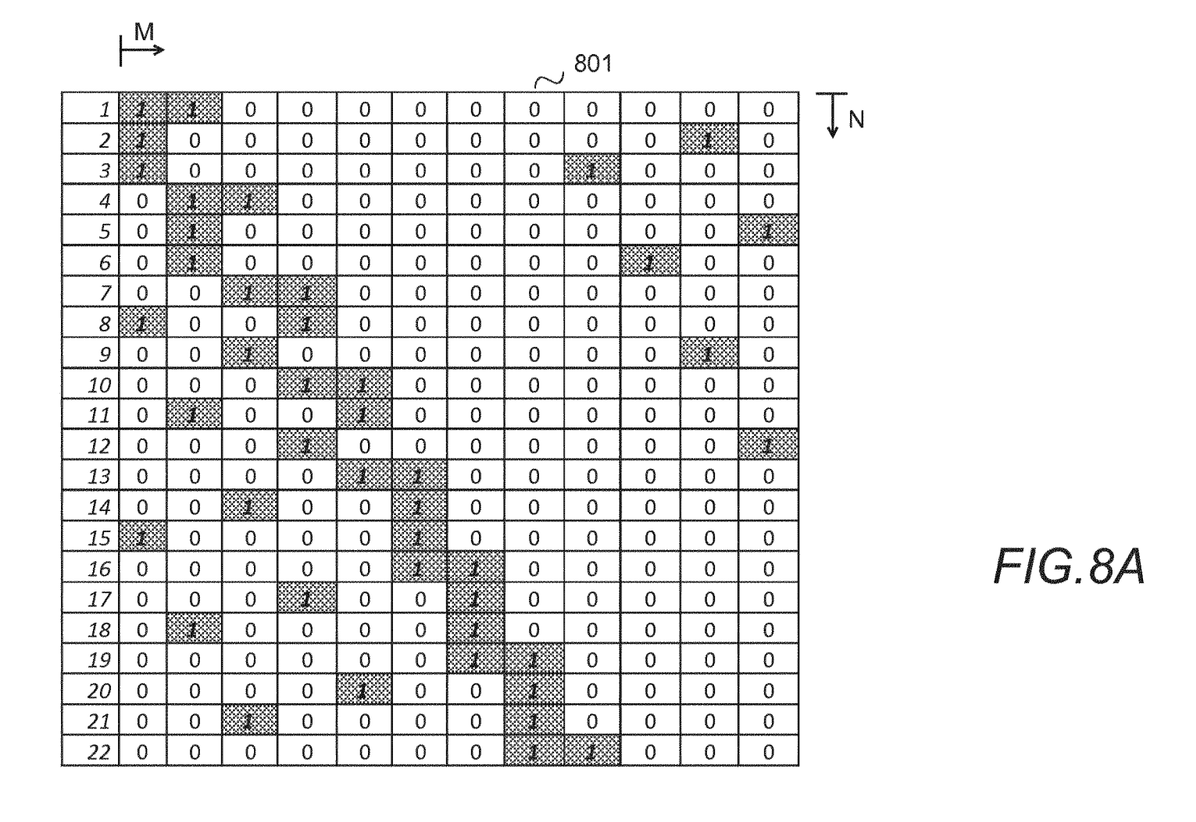
FIGS. 8A, 8B and 8C illustrate an exemplary configuration of the physical channel.
Figure 8B:
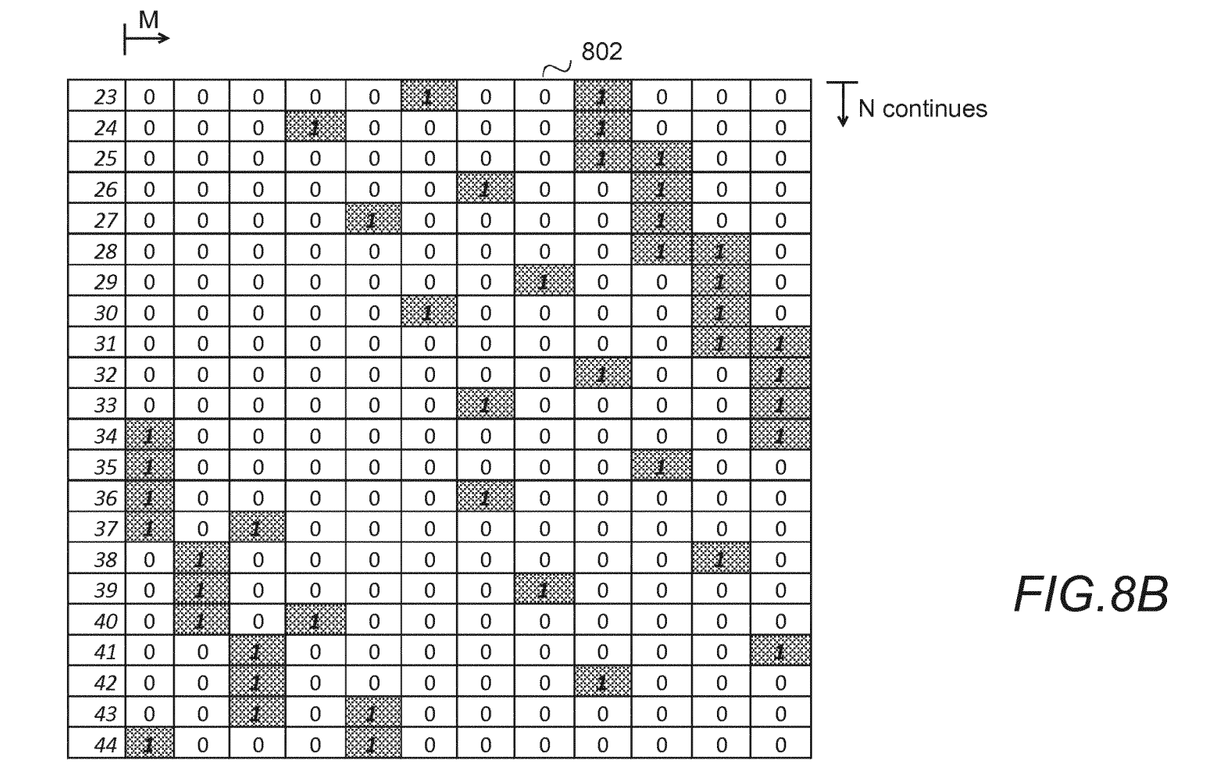
Figure 8C:
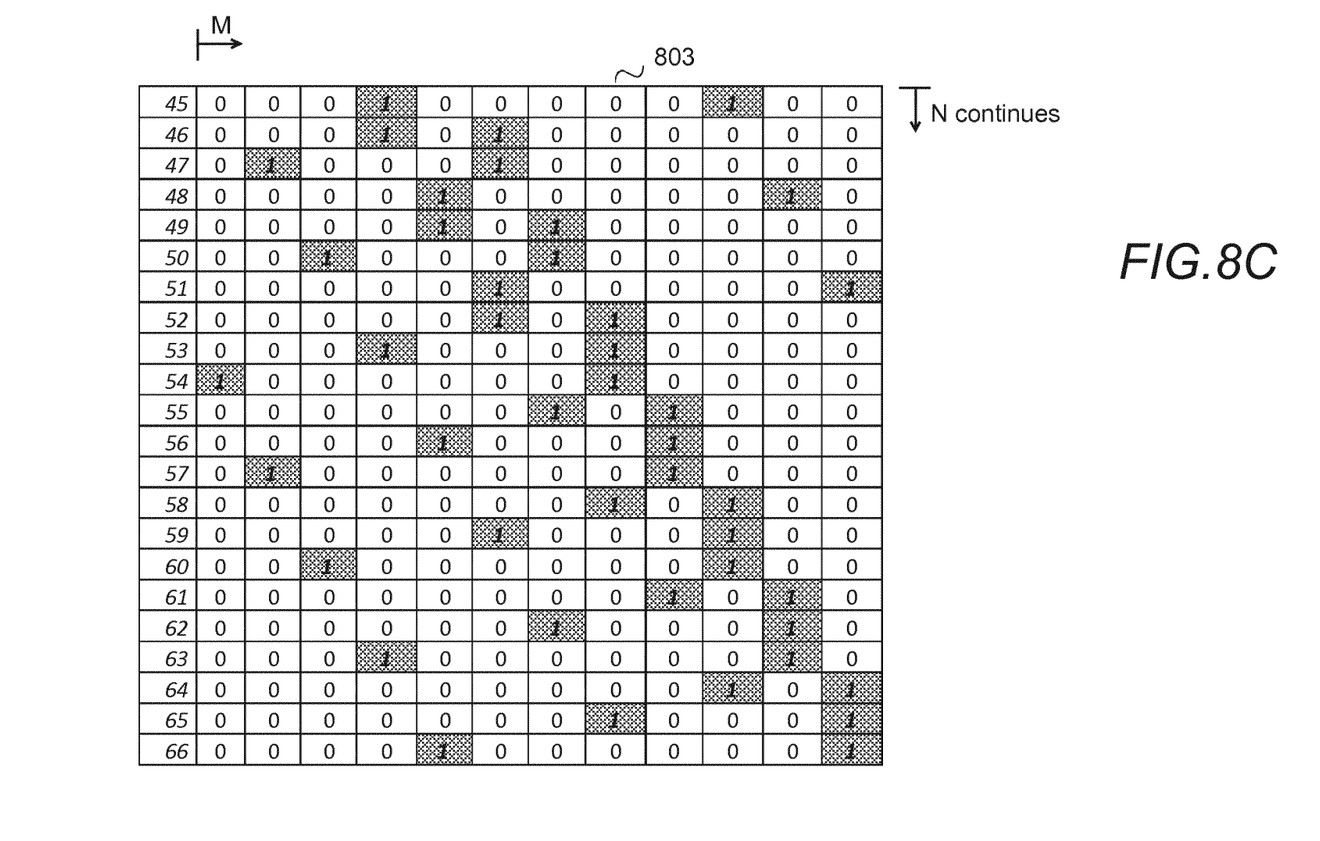
Figure 9:
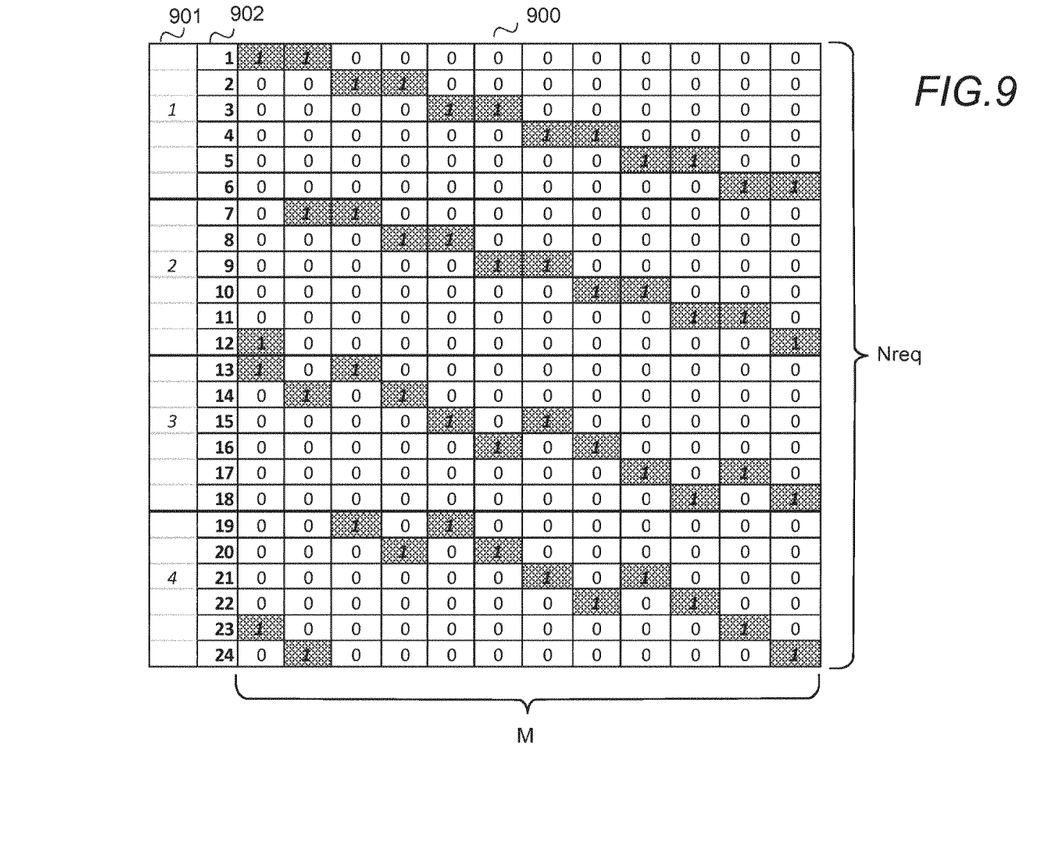
FIG. 9 illustrates another exemplary configuration of the physical channel.

The table 900 in FIG. 9 illustrates sub-group patterns allocated for the example 1 (input values X-max=60 and M-max=20), when Xreq=24. As can be seen from the table 900, by dividing the SRS patterns (the table illustrated in FIGS. 8A, 8B and 8C) into the sub-groups, it is possible to allocate 24 bi-discovery patterns (index 902) using only four parallel resources 901 instead of eleven, and yet to provide the actually required resources for SRS sounding. As can be seen from the table in FIG. 9, all physical resources in time, i.e. the serial resources M, are used but the amount of parallel resources are reduced from N to Nreq. Hence, the coordinated allocation increases supported patterns with given resources; as can be seen from the table illustrated in FIGS. 8A, 8B and 8C, non-coordinated allocation supports only 10 patterns with four parallel resources, already the 11th pattern requires the 5th parallel resource.

However, if the amount of user equipments in the service group increases, it is possible to increase the number of SRS patterns up to the amount allocated for X-max while still maintaining the planned latency.

If in step 303 it is detected that the relationship Xreq/X-max is not below the threshold the number of SRS patterns allocated for X-max is used in step 308.

Figure 4:
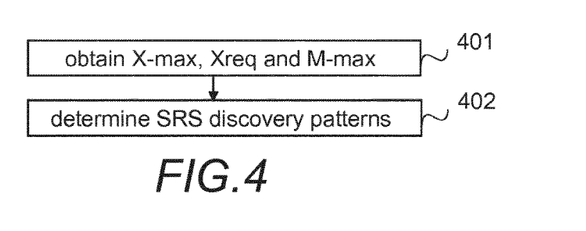

FIG. 4 is a flow chart illustrating another exemplary functionality of an apparatus comprising the allocation unit. In the illustrated example it is assumed that different sounding pattern groups with different input parameters, such as X-max and M-max are generated beforehand and stored to a memory that is either within the apparatus or accessible by the apparatus. Further, in the illustrated example, it is assumed that a sounding pattern group is associated with X-max and M-max values with which the group has been created, and the group is further a coordinated group which has associated information on how many sub-channels are to be allocated for different required capacities for sounding (different amounts of actual user equipments), i.e. the group is associated with different Xreq values.

Referring to FIG. 4, when the allocation unit obtains in step 401 X-max, Xreq, and M-max, it determines in step 402, by using X-max and M-max as a selection key, the group of sounding patterns, and using then the Xreq to select SRS pattern sub-groups from the group of sounding patterns. Xreq will then determine the actual number of resources needed.

For example, if X-max=60, M-max=20 and Xreq=24 are obtained, the group of sounding patterns is (M,k)=(12,2) and corresponds to the table represented in FIGS. 8A, 8B and 8C but it is an organized table associated with sub-groups indicating Xreq, and then sub-groups providing sufficient capacity for the Xreq amount are selected, the result being the one illustrated in the table 900 of FIG. 9 (i.e., with Xreq=24, N-req=4).

In another embodiment, in step 401 only X-max and M-max are obtained, and hence only the group of sounding patterns is determined, and if Xreq is received, the process described above with FIG. 3 is performed.

In a further embodiment, in step 401 only Xreq and M-max are obtained and Xreq is interpreted to be X-max for the selection of the group of sounding patterns.

However, an advantage of the solution described with FIG. 4, i.e. using X-req/Nreq (instead of mere X-max/Nmax) is that it allows for dynamically varying number of patterns while minimizing the resource consumption. For example, if a new user equipment appears to the system, the allocations and patterns for current UEs can be kept, only an additional parallel resource need to be allocated from the pattern group, as long as the total amount does not exceed X-max. Basically, one may start by allocating (selecting) one pattern, then a further, etc.

The steps and related functions described above in FIGS. 2, 3 and 4 are in no absolute chronological order, and some of the steps may be performed simultaneously or in an order differing from the given one. Other functions can also be executed between the steps or within the steps. For example, between steps 303 and 308, it could be checked whether or not Xreq is smaller than or equal to X-max, and if not, there may be rules, based on which it is decided whether to trigger the procedure of FIG. 2 or to alert/prompt someone(s) or to proceed to step 308 (which is proceed, if Xreq is not bigger than X-max). Another example is that in FIG. 3 it may be checked, after Xreq is obtained, whether or not patterns for sounding have been configured to the service group, and if not, the process described with FIG. 2 is triggered, otherwise it is continued to step 302. Some of the steps/messages or part of the steps/messages can also be left out or replaced by a corresponding step/message or part of the step/message.

Figure 10:
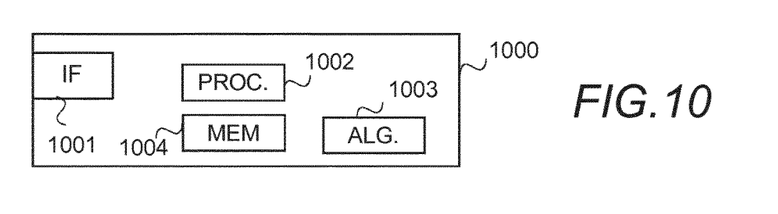
FIG. 10 is a schematic block diagram of an exemplary apparatus.

FIG. 10 is a simplified block diagram illustrating some units for an apparatus 1000 configured to configure the physical channel for sounding in D2D communication environment, i.e. an apparatus providing at least the dimensioning unit and/or an allocation unit, and/or one or more units configured to implement at least some of the functionalities described above. In the illustrated example, the apparatus comprises one or more interfaces (IF) 1001 for receiving and transmitting information over the wireless interface(s), a processor 1002 configured to implement at least some functionality described above with a corresponding algorithm/algorithms 1003, and memory 1004 usable for storing a program code required at least for the implemented functionality and the algorithms. The memory 1004 is also usable for storing other information, like the different sets of sounding patterns or X-max or M-max.

In other words, the apparatus is a computing device that may be any apparatus or device or equipment configured to perform one or more of corresponding apparatus functionalities described with an embodiment/example/implementation, and it may be configured to perform functionalities from different embodiments/examples/implementations. The unit(s) described with an apparatus may be separate units, even located in another physical apparatus, the distributed physical apparatuses forming one logical apparatus providing the functionality, or integrated to another unit or to each other in the same apparatus.

The techniques described herein may be implemented by various means so that an apparatus implementing one or more functions of a corresponding apparatus described with an embodiment/example/implementation comprises not only prior art means, but also means for implementing the one or more functions of a corresponding apparatus described with an embodiment and it may comprise separate means for each separate function, or means may be configured to perform two or more functions. For example, the dimensioning unit and/or an allocation unit, and/or algorithms, may be software and/or software-hardware and/or hardware and/or firmware components (recorded indelibly on a medium such as read-only-memory or embodied in hard-wired computer circuitry) or combinations thereof. Software codes may be stored in any suitable, processor/computer-readable data storage medium(s) or memory unit(s) or article(s) of manufacture and executed by one or more processors/computers, hardware (one or more apparatuses), firmware (one or more apparatuses), software (one or more modules), or combinations thereof. For a firmware or software, implementation can be through modules (e.g., procedures, functions, and so on) that perform the functions described herein. Software codes may be stored in any suitable, processor/computer-readable data storage medium(s) or memory unit(s) or article(s) of manufacture and executed by one or more processors/computers.

The apparatus may generally include a processor, controller, control unit, micro-controller, or the like connected to a memory and to various interfaces of the apparatus. Generally the processor is a central processing unit, but the processor may be an additional operation processor. Each or some or one of the units and/or algorithms described herein may be configured as a computer or a processor, or a microprocessor, such as a single-chip computer element, or as a chipset, including at least a memory for providing storage area used for arithmetic operation and an operation processor for executing the arithmetic operation. Each or some or one of the units and/or algorithms described above may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed in such a way to carry out one or more functions of one or more embodiments/implementations/examples. In other words, each or some or one of the units and/or the algorithms described above may be an element that comprises one or more arithmetic logic units, a number of special registers and control circuits.

Further, the apparatus may generally include volatile and/or non-volatile memory, for example EEPROM, ROM, PROM, RAM, DRAM, SRAM, double floating-gate field effect transistor, firmware, programmable logic, etc. and typically store content, data, or the like. The memory or memories may be of any type (different from each other), have any possible storage structure and, if required, being managed by any database management system. The memory may also store computer program code such as software applications (for example, for one or more of the units/algorithms) or operating systems, information, data, content, or the like for the processor to perform steps associated with operation of the apparatus in accordance with examples/embodiments. The memory, or part of it, may be, for example, random access memory, a hard drive, or other fixed data memory or storage device implemented within the processor/apparatus or external to the processor/apparatus in which case it can be communicatively coupled to the processor/network node via various means as is known in the art. An example of an external memory includes a removable memory detachably connected to the apparatus.

The apparatus may generally comprise different interface units, such as one or more receiving units for receiving user data, control information, requests and responses, for example, and one or more sending units for sending user data, control information, responses and requests, for example. The receiving unit and the transmitting unit each provides an interface in an apparatus, the interface including a transmitter and/or a receiver or any other means for receiving and/or transmitting information, and performing necessary functions so that the control information, etc. can be received and/or sent. The receiving and sending units may comprise a set of antennas, the number of which is not limited to any particular number.

Further, the apparatus may comprise other units, such as one or more user interfaces for receiving user inputs and/or outputting information to the user.

It will be obvious to a person skilled in the art that, as technology advances, the inventive concept can be implemented in various ways. The invention and its embodiments are not limited to the examples described above but may vary within the scope of the claims.

It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
receiving an input that includes a required maximum capacity for sounding or discovery and a maximum tolerated latency for a service group comprising one or more apparatuses being configured to use half-duplex wireless device-to-device communication;
selecting a pattern group from a set of pattern groups based on the received input; and
configuring physical resources for the half-duplex wireless device-to-device communication to the service group to have, for sounding or discovery within the service group, one or more patterns in the selected pattern group, the one or more patterns defining for the physical resources, a number of serial resources, a number of parallel resources, and a number of transmission phases.

2. The method as claimed in claim 1:
wherein selecting the pattern group is further based on a total number of resources; and
wherein each pattern group is characterized by at least one of the following properties: a number of patterns, the number of parallel resources, the number of serial resources, and the number of transmission phases.

3. The method as claimed in claim 1, wherein the selecting the pattern group comprises:
calculating a number of patterns in the pattern group for the set of pattern groups, the set of pattern groups starting from a pattern group comprising one serial resource and having one transmission phase and ending to a pattern group comprising an amount of serial resources corresponding to the maximum tolerated latency and having at most as many transmission phases as parallel resources;
calculating a number of parallel resources required in the pattern group for the pattern groups;
calculating total number of resources in the pattern group for the pattern groups; and
selecting amongst the pattern groups one pattern group whose number of patterns provide the required maximum capacity for sounding or discovery with a minimum total number of resources.

4. The method as claimed in claim 3, further comprising:
determining the number of parallel resources, the number of serial resources, the number of patterns and the number of transmission phases in said selected one pattern group using calculation results;
creating patterns for sounding or discovery of the service group using the determined number of parallel resources, the determined number of serial resources, the determined number of patterns and the determined number of transmission phases; and
using one or more of the created patterns when configuring the physical resources.

5. The method as claimed in claim 4, further comprising:
receiving a further input comprises a required actual capacity for sounding or discovery for the service group;
determining the number of required parallel resources using the required actual capacity for sounding or discovery for the service group, the determined number of serial resources and the determined number of transmission phases;
allocating, from the created patterns, as many sub-groups as is the number of required parallel resources; and
configuring the physical channel to have patterns in the allocated sub-groups for sounding or discovery for the service group.

6. The method as claimed in claim 3, wherein at least one of the following formulas is used in the calculation:

$$\#PPG = \frac{M!}{k!(M-k)!};$$

$$N(k, M) = \frac{k \cdot (M-1)!}{k!(M-k)!}; \text{ and}$$

-continued $$\#TOTAL = N * M$$

wherein #PPG is the number of patterns in a pattern group;
N is the number of parallel resources in a pattern group;
TOTAL is the total number of resources needed in the physical channel per cycle;
M=(1, 2, . . . M-max);
k=(0, 1 . . . M-max, or a value below M-max) defines the number of the transmission phases; and
M-max is the maximum tolerated latency.

7. The method as claimed in claim 1, further comprising organizing the patterns for sounding or discovery to a coordinated order according to a rule.

8. The method as claimed in claim 7, wherein the organizing further comprises dividing the patterns to sub-groups during organizing, and wherein the rule comprises:
a transmission phase appears at maximum once at a time within patterns that are part of the same sub-group, and each sub-group consumes one parallel resource.

9. An apparatus comprising at least one processor; and one memory including computer program code, wherein the at least one memory and the computer program code are configured to, with the at least one processor, cause the apparatus to:
receive an input that includes a required maximum capacity for sounding or discovery and a maximum tolerated latency for a service group comprising one or more apparatuses being configured to use half-duplex wireless device-to-device communication;
select a pattern group from a set of pattern groups based on the received input; and
configure physical resources for the half-duplex wireless device-to-device communication to the service group to have, for sounding or discovery within the service group, one or more patterns in the selected pattern group, the one or more patterns defining for the physical resources, a number of serial resources, a number of parallel resources, and a number of transmission phases.

10. A system supporting a multi-apparatus environment and comprising:
at least two apparatuses, a first apparatus and a second apparatus, belonging to a service group and being configured to use half-duplex wireless device-to-device communication;
at least the first apparatus being configured to:
receive an input that includes a required maximum capacity for sounding or discovery and a maximum tolerated latency for the service group;
calculate a number of patterns in a pattern group for a set of pattern groups, the set starting from a pattern group comprising one serial resource and having one transmission phase and ending to a pattern group comprising an amount of serial resources corresponding to the maximum tolerated latency and having at most as many transmission phases as parallel resources;
calculate a number of parallel resources in the pattern group for the pattern groups;
calculate total number of resources in the pattern group for the pattern groups;
select amongst the pattern groups one pattern group whose number of patterns provide the required maximum capacity for sounding or discovery with a minimum total number of resources;
determine the number of parallel resources, the number of serial resources, the number of patterns and the number of transmission phases in said selected one pattern group using calculation results; and
create patterns for sounding or discovery of the service group using the determined number of parallel resources, the determined number of serial resources, the determined number of patterns and the determined number of transmission phases; and
at least the second apparatus configured to:
receive an input that includes a value of a required capacity for sounding or discovery for a service group that comprises the one or more apparatuses configured to use half-duplex wireless device-to-device communication;
select, from the patterns created for sounding or discovery, one or more patterns based on the value of the required capacity; and
configure a physical channel providing the half-duplex wireless device-to-device communication to the service group to have the selected one or more patterns for sounding or discovery for the service group.

11. The system as claimed in claim 10, wherein the third apparatus is further configured to be the second apparatus to create the patterns, wherein the required maximum capacity for sounding or discovery or the maximum tolerated latency for the service group is received with the required capacity for the sounding or discovery or as a separate input or obtained as part of service group information.

12. The system as claimed in claim 10, wherein centralized scheduling is implemented in the device-to-device communication, and the apparatus configured to perform the centralized scheduling is further configured to be also the first apparatus or the second apparatus.

13. The system as claimed in claim 10, wherein distributed scheduling is implemented in the device-to-device communication and at least one of the two apparatuses is further configured to be also the first apparatus or the second apparatus.

* * * * *